(12) United States Patent
Forest et al.

(10) Patent No.: US 11,923,095 B2
(45) Date of Patent: Mar. 5, 2024

(54) PLASMA GENERATOR WITH PERMANENT MAGNET DIVERTOR

(71) Applicant: Wisconsin Alumni Research Foundation, Madison, WI (US)

(72) Inventors: Cary Brett Forest, Madison, WI (US); Jonathan Pizzo, Madison, WI (US); Oliver Schmitz, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 281 days.

(21) Appl. No.: 17/461,366

(22) Filed: Aug. 30, 2021

(65) Prior Publication Data
US 2023/0069516 A1  Mar. 2, 2023

(51) Int. Cl.
*G21B 1/05* (2006.01)

(52) U.S. Cl.
CPC ..................... *G21B 1/05* (2013.01)

(58) Field of Classification Search
CPC ....................................................... G21B 1/05
USPC .................................................. 376/133, 134
See application file for complete search history.

(56) References Cited

U.S. PATENT DOCUMENTS

| 10,966,310 B1 | 3/2021 | Forest et al. |
| 2011/0170648 A1* | 7/2011 | Kotschenreuther .... G21B 1/057 376/133 |

FOREIGN PATENT DOCUMENTS

| JP | H0659063 A | * | 3/1994 |
| JP | 2001194477 A | | 7/2001 |
| JP | 2001242271 A | | 9/2001 |
| KR | 20130114636 A | | 10/2013 |

OTHER PUBLICATIONS

International Search Report for PCT/US2022/039709.
J.A. Casey et al.; "Experimental studies of divertor stabilization in an axisymmetric tandem mirror." the Physics of 31, No. 7 (Dec. 1987): pp. 1-33. Massachusetts fluids.

* cited by examiner

*Primary Examiner* — Jack W Keith
*Assistant Examiner* — Daniel Wasil
(74) *Attorney, Agent, or Firm* — Boyle Fredrickson, SC

(57) ABSTRACT

A divertor for system supporting plasma for fusion employs permanent magnets providing far weaker magnetic field strength than conventionally used in cryogenic magnetic systems through an ability to place the permanent magnets in close proximity to the plasma containment volume.

16 Claims, 5 Drawing Sheets

PLASMA GENERATOR WITH PERMANENT MAGNET DIVERTOR

STATEMENT REGARDING FEDERALLY SPONSORED RESEARCH OR DEVELOPMENT

This invention was made with government support under DE-AR0001258 awarded by the US Department of Energy. The government has certain rights in the invention.

CROSS REFERENCE TO RELATED APPLICATION

BACKGROUND OF THE INVENTION

The present invention relates to an apparatus for generating high-energy plasmas that can promote nuclear fusion and/or provide neutron sources and, in particular, to systems using magnetic confinement and a limiter or divertor for removing low-energy ions.

High-temperature plasmas can be confined away from a physical container by a magnetic confinement system to avoid damage to the container and possible plasma quenching. A number of such confinement systems exist including magnetic mirror systems and toroidal systems such as tokomaks. In a magnetic mirror system, an axial magnetic field extends along a chamber between two ends of the chamber where the magnetic flux lines converge. Plasma ions moving within this axial magnetic field spiral along the flux lines at the local cyclotron frequency and are "reflected" at the chamber ends by an axial component of magnetic force acting on the spiraling ions. This reflecting magnetic force is caused by the flux line convergence and concomitant increasing magnetically induced force in the direction away from the convergence. The point at which the ions are reflected (the turnaround point) is generally earlier for higher energy ions.

Nuclear fusion can be promoted in a magnetic confinement system by generating plasma with sufficiently high energy and density. The interface between the hot confined plasma (>10 million degrees) and the material walls of the vacuum vessel is critical both to protect the walls of the vessel but also to prevent the hot plasma from cooling. In such plasmas, high energy ions, which are confined to tight orbits around magnetic field lines but are free to move in the direction of the magnetic field. The plasma boundary is defined by the magnetic field line that intersects the material wall at a place to be known as a limiter. Usually this limiter is a heat and particle flux resistant surface constructed of a refractory metal or graphite material with a very high melting temperature and a high work function to reduce material erosion. In a magnetic mirror system, the limiter materials may be placed close to the mirror coils at each end and operate to protect the vacuum vessel and magnet from plasma bombardment. Limiters of this kind, being in direct contact with the plasma, may not effectively allow the removal of ions (pump out) after collision and create a risk of sputtering of high Z limiter material back into the plasma containment volume when subject to a high rate of collisions. These processes in turn feedback to cool the central hot plasma and reduce fusion output.

In part to address these problems, it is also known to use a divertor providing a separate volume outside of the plasma containment volume for capturing and discharging low-energy ions. The divertor uses magnetic coils that locally divert the magnetic field lines of the containment volume into a separate divertor volume, producing an exit channel for low-energy plasma ions spiraling near the periphery of the containment volume. After passing through the exit channel, the ions collide with the divertor target in an extraction volume partitioned from the confinement volume. There, the ions are neutralized and may be pumped away by appropriate vacuum pumps. As well as managing for the removal of tow-energy ions, the divertor can also improve the magnetohydrodynamic stability of the plasma, possibly by weakening the constraining field to produce a circular channel along which electrons can flow to eliminate destabilizing azimuthal electrical field gradients.

Plasmas with sufficient energy for fusion require high constraining field strengths and for this reason cryogenic superconducting electromagnets are employed in the divertor to create the necessary bucking magnetic fields. The high field strengths of cryogenic electromagnets also allow the magnets to be displaced from the high temperatures of the plasma containment volume and outside of the neutron shielding or absorption structures. Such cryogenic electromagnetic coils are inherently expensive both with respect to their construction materials and the necessary associated cryogenic handling machinery and electrical control circuitry. Practically, superconducting electromagnetic coils need to be pre-wound around the plasma containment volume making assembly and replacement difficult.

SUMMARY OF THE INVENTION

The present inventors have determined that a divertor can be constructed with permanent magnets avoiding many of the problems of cryogenic electromagnets. While permanent magnets are generally much lower in field strength than can be obtained with cryogenic coils, they can be placed inside of the neutron absorption materials, closer to the high temperature plasma thus offsetting some of the disadvantages of lower field strength, and even within the vacuum of the plasma containment volume itself. The effective field strength of such permanent magnet structures in bucking the magnetic containment field can be boosted by flux focusing with a Halbach array design. The result is a lower cost structure that is far more easily assembled and replaced.

In one embodiment, the invention provides an apparatus for producing high-energy plasma having a containment field magnet structure providing containment magnetic flux lines for cyclonic retention of plasma ions at fusion energies in a containment volume. A divertor magnet structure of permanent magnets adjacent to the containment volume creates an X point of zero magnetic field allowing plasma ions at the periphery of the containment volume to escape into an extraction volume outside of the containment volume.

It is thus a feature of at least one embodiment of the invention to eliminate the expense and manufacturing challenges of using cryogenic electromagnetic coils in divertors.

The apparatus may further include a neutron absorption structure surrounding the containment volume providing the primary absorption of the neutron energy, and the permanent magnet structure maybe placed between the neutron absorption structure and the containment volume. Alternatively, or in addition, the permanent magnet structure may be placed within a thermal shield having cooling channels for receiving a circulating coolant to remove neutron induced heating.

It is thus a feature of at least one embodiment of the invention to compensate for the lower field strengths of permanent magnet structures by moving the permanent magnet structure substantially closer to the plasma and furnishing a suitable material baffling structure to enable neutral particle pumping.

The apparatus may further include a coolant flow system providing coolant flow conduits in thermal communication with permanent magnets, a coolant flow pump, and a coolant cooler to recirculate coolant to extract heat from the permanent magnet structure.

It is thus a feature of at least one embodiment of the invention to actively cool the permanent magnet structure allowing close proximity to the plasma.

The divertor magnet structure may provide a first hoop of permanent magnet material generating flux lines in the containment volume counter to the containment magnetic flux lines.

It is thus a feature to create a permanent magnet structure providing flux lines comparable to those provided by a hoop of superconducting material having current flow therein.

The divertor magnet structure may further provide a Halbach array further including second and third hoops together flanking the first hoop and having magnetic polarization with opposite polarity to each other and perpendicular to the first hoop.

It is thus a feature of at least one embodiment of the invention to greatly boost the magnetic field strength of the permanent magnet near the X point to accommodate a substantially weaker field strength of permanent magnets when compared to cryogenic electromagnets.

The apparatus may further include walls separating the containment volume from an extraction volume and providing an opening centered about the X point along a plane perpendicular to the containment magnetic flux lines crossing the plane, the walls extending away from the opening away from the plane.

It is thus a feature of at least one embodiment of the invention to promote capture of neutral particles born from the extracted low-energy ions in the extraction volume through the extraction volume wall geometry tending to block scatter.

In this regard, the apparatus may include a target in the extraction volume presenting a face for receiving escaping plasma ions and deflecting the escaping ions into a walled chamber outside of the containment volume—called a divertor baffling structure.

It is thus a feature of at least one embodiment of the invention to reduce backscatter into the plasma containment volume through the orientation of the target faces and appropriate closure through the baffle.

The apparatus may further include a permanent magnet shield layer positioned between the permanent magnet and the containment volume.

These particular objects and advantages may apply to only some embodiments falling within the claims and thus do not define the scope of the invention.

DETAILED DESCRIPTION OF THE PREFERRED EMBODIMENT

Figure 1:
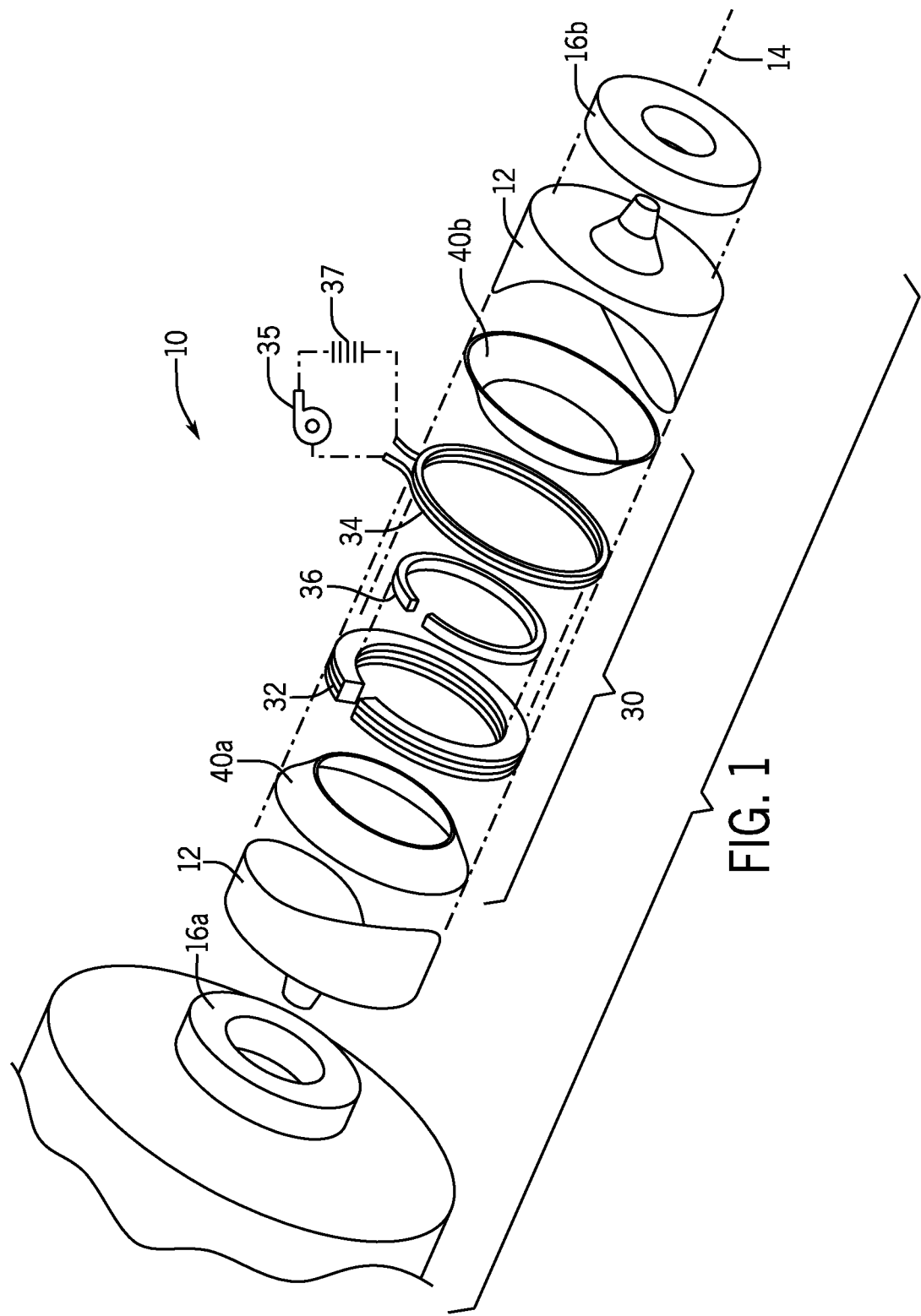
FIG. 1 is an exploded, perspective view of one embodiment of the invention implementing a magnetic mirror containment system with a permanent magnet divertor.
Figure 2:
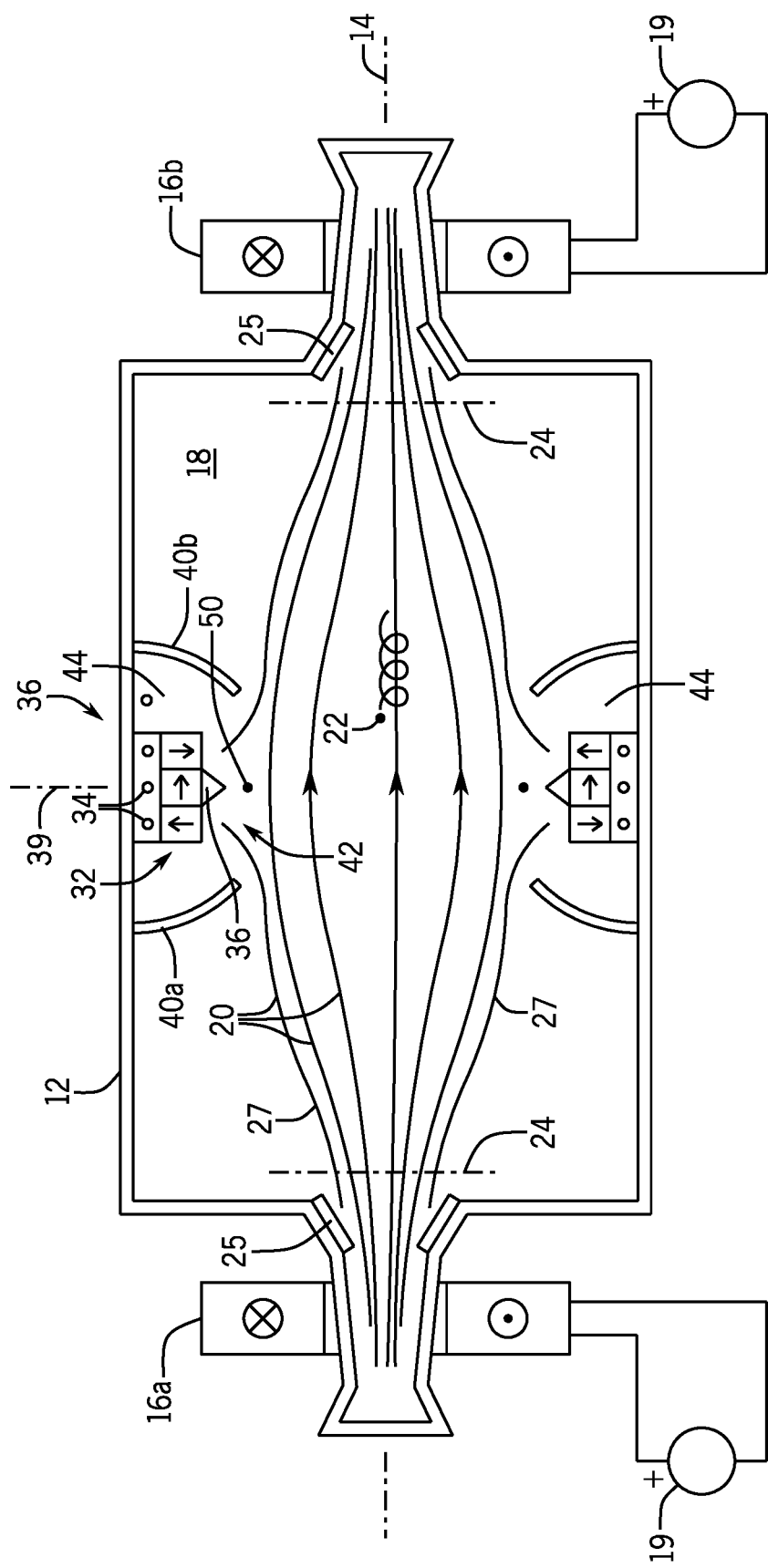
FIG. 2 is an elevational cross-section through the assembled magnetic mirror system of FIG. 1 showing the generation of field lines and the x-points near the divertor.

Referring now to FIGS. 1 and 2, a high-energy plasma system 10 in one embodiment of the present invention may be in the form of a magnetic mirror containment system having a pressure vessel 12, for example, in the form of a sealed cylindrical shell of stainless steel or the like, extending along an axis 14 for receipt of a reaction gas, such as deuterium or tritium.

First and second ring magnets 16*a* and 16*b* are positioned at the ends of the pressure vessel 12 and separated along the axis 14 to define a containment volume 18 therebetween. The magnets 16 act as a Helmholtz pair to produce containment field lines 20 passing (as depicted) from left to right along axis 14 for establishing an axial $B_0$ field therebetween. The axial $B_0$ field will be sufficient to contain plasma with sufficient energy to promote fusion and will typically provide a field of greater than 15 T at the magnets 16*a* and 16*b* dropping to 0.3 T near the center of the containment volume 18. For example, the containment volume 18 between magnet 16*a* and 16*b* may have a length of 2 m with a mirror ratio of approximately 20 (typically greater than three).

In one embodiment, the magnets 16 may be cryogenic electromagnetic coils coaxial with axis 14 and powered by an external, controllable DC power supply 19 of the type understood in the art although the invention contemplates that permanent magnets may be used in this capacity.

As is generally understood in the art, high-energy plasma 22 will be contained by the containment field lines 20 to orbit helically along the containment field lines 20 between the ends of the pressure vessel 12. At the ends of the pressure vessel 12, the plasma 22 is reflected by forces resulting from a convergence of the containment field lines 20 at turnaround points 24. The locations of the turnaround points 24 along the axis 14 will be dependent on the plasma energy with lower-energy plasma having turnaround points 24 closer to the ends of the pressure vessel 12. Details of the construction of a magnetic mirror containment system suitable for use with the present invention are provided in U.S. Pat. No. 10,966,310 issued Mar. 30, 2021, assigned to the assignee of the present application and hereby incorporated by reference.

In one embodiment, the pressure vessel 12 may provide for funnel-shaped limiter surfaces 25 at its ends positioned coaxial about axis 14. These limiter surfaces 25 define the limits of the travel of plasma 22 along a field line and hence establish a limiter flux surface 27 being the limits of contained plasma 22. The limiter surfaces 25 may be a low Z material such as graphite or tungsten (W)

The high-energy plasma system 10 includes a permanent magnet divertor 30, which in one embodiment has a hoop-shaped divertor magnet structure 32 positioned inside the periphery of the pressure vessel 12 midway between the ends of the pressure vessel 12 and coaxial with axis 14. A set of cooling conduits 34 are placed in close thermal communication with the outer surface of the divertor magnet structure, for example, in the form of a helix of tubing passing circumferentially around the outer surface of the divertor magnet structure 32 and attached thereto. The cooling conduits 34 may receive circulated coolant, for example, water by means of a pump 35 and heat exchanger 37.

Fitting within the hoop of the divertor magnet structure 32 is a divertor target 36, for example, providing a triangular cross section whose apex points inward along a bisecting plane 39 of the hoop and whose base abuts the inner surface of the hoop of the divertor magnet structure 32. Left and right extraction volume walls 40a and 40b are positioned symmetrically around the divertor magnet structure 32 attaching to the inner surface of the pressure vessel 12 at an outermost radial extent and passing inwardly and toward each other to define a plasma exit opening 42 therebetween and centered along the bisecting plane 39. Together the left and right extraction volume walls 40a and 40b define a partially enclosed extraction volume 44 segregated from a containment volume 18 within the pressure vessel 12 into which low energy plasma ions can be extracted by means of a pump 56 (shown in FIG. 4).

Figure 3:
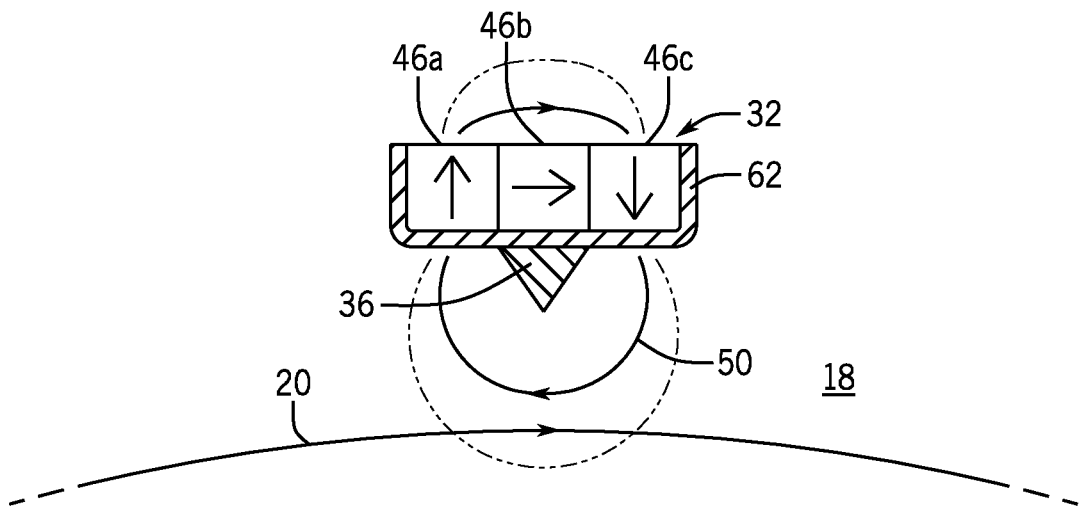
FIG. 3 is a detailed cross-sectional elevational view of the permanent magnet structure of the divertor showing the generation of a diverting field against, the containment field provided by the mirror system.

Referring now to FIG. 3, the divertor magnet structure 32 may be assembled of three component hoops 46a, 46b, and 46c, each having substantially the same diameter and wall cross sections, with hoops 46a and 46c attached to and flanking hoop 46b on the left and right side. Each of these hoops may be constructed of a rare earth permanent magnet material such as neodymium (NdFeB), samarium cobalt (SmCo), or iron nitride (FeN) and will provide a magnetization $\mu_0 M > 1.0$ T. The polarization of each of the hoops 46 is such as to create a Halbach array tending to concentrate the resultant magnetic field toward the inner surfaces of the hoop. In this respect, for example, the leftmost hoop 46a may have a radial polarization (perpendicular to axis 14) with the north pole radially outward, and the central hoop 46b may have an axial polarization (parallel to axis 14) with the north pole to the right (as depicted), and the rightmost hoop 46c may have a radial polarization with the north pole radially inward. The result countervailing or bucking field lines 50 pass from right to left within the containment volume 18 and in opposite direction to the containment field lines 20.

Figure 4:
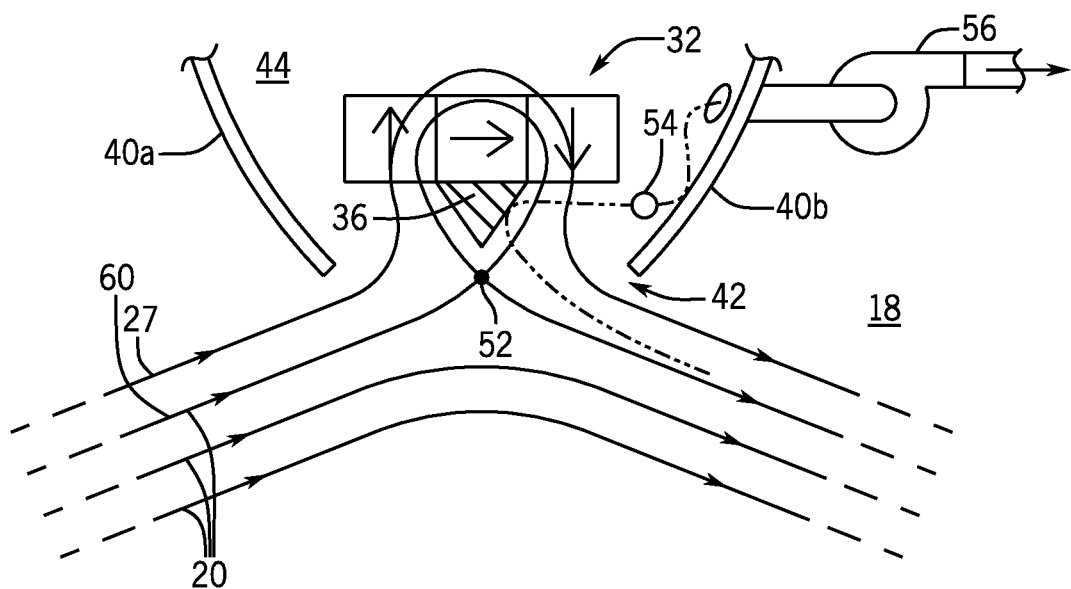
FIG. 4 is a figure similar to that of FIG. 3 showing resultant field lines from a combination of the containment field and the bucking field to produce the x-points and the trajectory of an escaped plasma ion.

Referring now also to FIG. 4, the bucking field lines 50 and containment field lines 20 will combine to create an X point 52 of zero magnetic field positioned inward from the outer walls of the divertor magnet structure 32 and roughly centered on plasma exit opening 42. This X point 52 (in fact a ring of X points about the axis 14) provides a path of escape for low-energy plasma particle 54 into the volume 44. Generally, the same field interaction that defines the X point 52 will define a separatrix flux surface 60 inside of the limiter flux surface 27. The space between these flux surfaces 60 and 27 provides a "scrape off" region such that plasma particles 54 having trajectories in the scrape off region will be conducted into the volume 44. Generally, these particles with larger orbits about an axis 14 will have lower energies and thus the divertors 30 selectively remove lower energy plasma. As noted above, the divertors 30 also may help improve plasma stability.

It will be appreciated that because the X point 52 may be close to the divertor magnet structure 32, the relatively low field strength of the divertor magnet structure 32 may be accommodated. This should be compared to conventional cryogenic coils which must be spaced further from the containment volume 18 and thus the X points 52. The close proximity between the divertor magnet structure 32 and the X points 52 is accommodated by the fact that the divertor magnet structure 32 may be placed in the containment volume 18.

Referring again to FIG. 3, high neutron exposure of the divertor magnet structure 32 may be moderated by a non-ferrous neutron shield 62, for example, providing high scattering away from the magnet structures 32.

Figure 5:
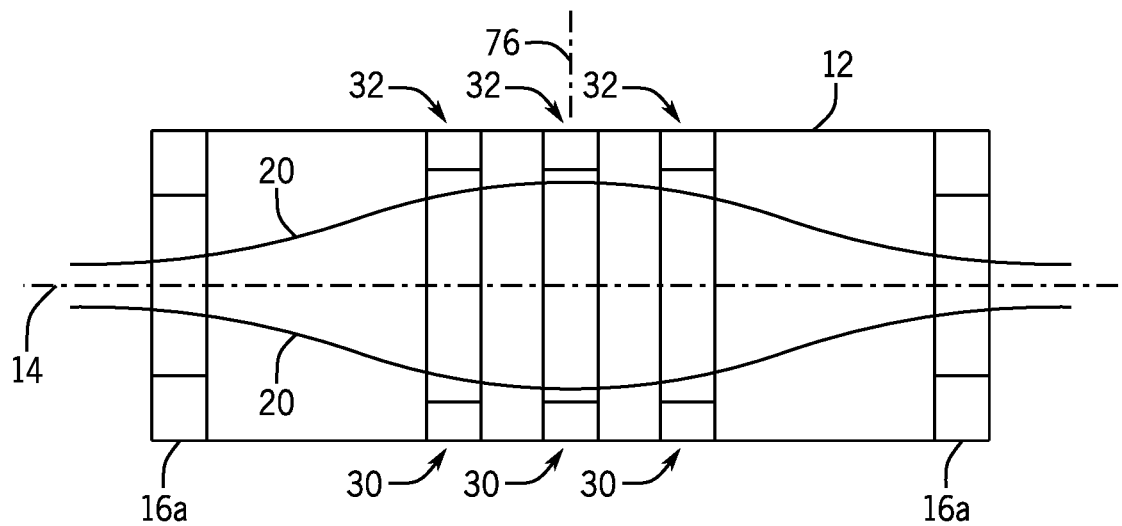
FIG. 5 is a simplified representation of FIG. 2 showing alternative locations of the divertors in a central mounting configuration.

Referring now to FIG. 5, it will be appreciated that multiple divertors 30 may be used for a given pressure vessel 12. In one embodiment, these divertors may exploit the fact that the magnetic field strength containment field line 20 is weaker toward the center of the pressure vessel 12 along axis 14. Generally, this would place any number of divertors 30 symmetrical about a centerline 70 between the ends of the pressure vessel 12 and magnet 16.

Figure 6:
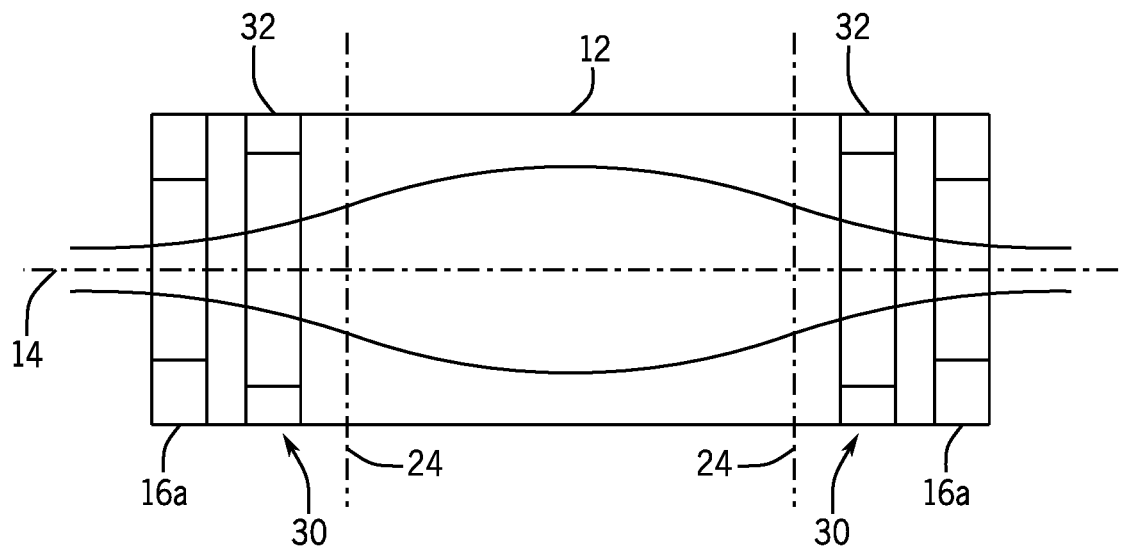
FIG. 6 is a figure similar to FIG. 5 showing and locations of the divertors past turnaround points of the high-energy ions.

Referring now to FIG. 6, with higher field strength permanent divertor magnet structures 32 the divertors 30 may be placed closer to the ends of the pressure vessel 12 outside of the turnaround points 24 of the desirable high-energy plasma thus preferentially removing low-energy plasma as selected both by its radial and axial distributions.

Figure 7:
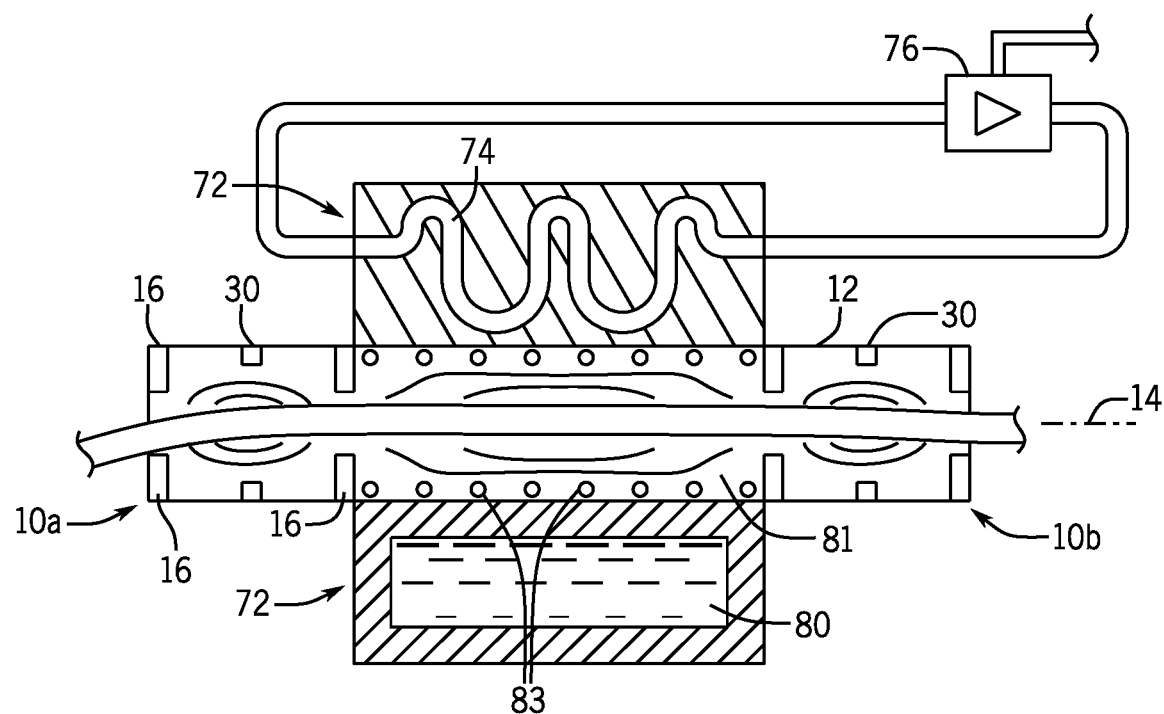
FIG. 7 is a representation of neutron absorbing structures that may be placed around a neutron generating chamber in a three-part plasma chamber design.

Referring now to FIG. 7, generally the pressure vessel 12 may be surrounded by neutron absorbers 72 providing either protection to surrounding equipment and personnel from neutrons or performing a utilitarian function, for example, the generation of energy. For this latter purpose, the neutron absorbers 72 may be received by a working fluid in conduits 74, for example, to drive a turbine system 76.

Alternatively, or in addition the neutrons may be used for the transmutation of materials, for example, in a contained volume 80 in the neutron absorber 72. For example, the contained volume 80 may be filled with an aqueous material for transmutation by high-energy neutrons such as precursors to medical isotopes 99Mo (molybdenum 99), 131I (iodine 131), 133Xe (xenon 133), and 177Lu (lutetium 177) or may support racks holding spent nuclear fuel rods being rejuvenated through transmutation by high-energy neutrons. Alternatively, nuclear waste may be treated to physically break up long-lived isotopes into shorter lived fragments through neutron collision making the waste easier to store or dispose of commercially Referring still to FIG. 7, in some embodiments, the high-energy plasma system 10 shown in FIG. 2 may be duplicated as part of a system where two high-energy plasma systems 10a and 10b act as "plugs" to trap high-energy plasma ions in a larger scale neutron generator volume 81 for the purpose of transmutation or fusion power generation (as discussed above). Such a design, for example, may make use of a tandem mirror scheme, for example, described at G. Dimov, V. Zakaidakov, and M. Kishinevski, Fiz. Plazmy 2 597 (1976), [Sov. J. Plasma], Phys 2, 326 (1976)] and T. K. Fowler and B. G. Logan, Comments on Plasma Physics and Controlled Fusion 2, 167 (1977) and hereby incorporated by reference.

More specifically, in such a tandem mirror neutron generator, first and second high-energy plasma systems 10a and 10b are placed in opposition along axis 14 flanking a generator volume 81. Generally, the high-energy plasma systems 10 will have an axial length on the order of 2 meter whereas the generating volume 81 will be much larger, for example, on the order of 50 meters or more.

The magnets 16 of both of the high-energy plasma systems 10a and 10b are axially aligned to provide a same direction of polarization of the magnetic field along the common axis 14. As such, the flux lines 20 of the first high-energy plasma system 10a may continue through the volume 81 to the second high-energy plasma system 10b. Within the volume 81, the containment field lines 20 are focused by an axially-extending solenoid coil 83 circling the axis 14 around the volume 81.

A subset of thermal plasma ions, having a uniform distribution of pitch angles and having been boosted to higher energies by kinetic transfer from the plasma ions, may escape from the high-energy plasma systems 10 into the volume 81 containing a reactant gas, for example, deuterium or tritium, to promote fusion and the emission of neutrons 64 from the volume 81. The high pressure of the high-energy plasma systems 10 blocks the escape of high-energy plasma ions from the volume 81 to maintain the high densities for significant fusion.

Figure 8:
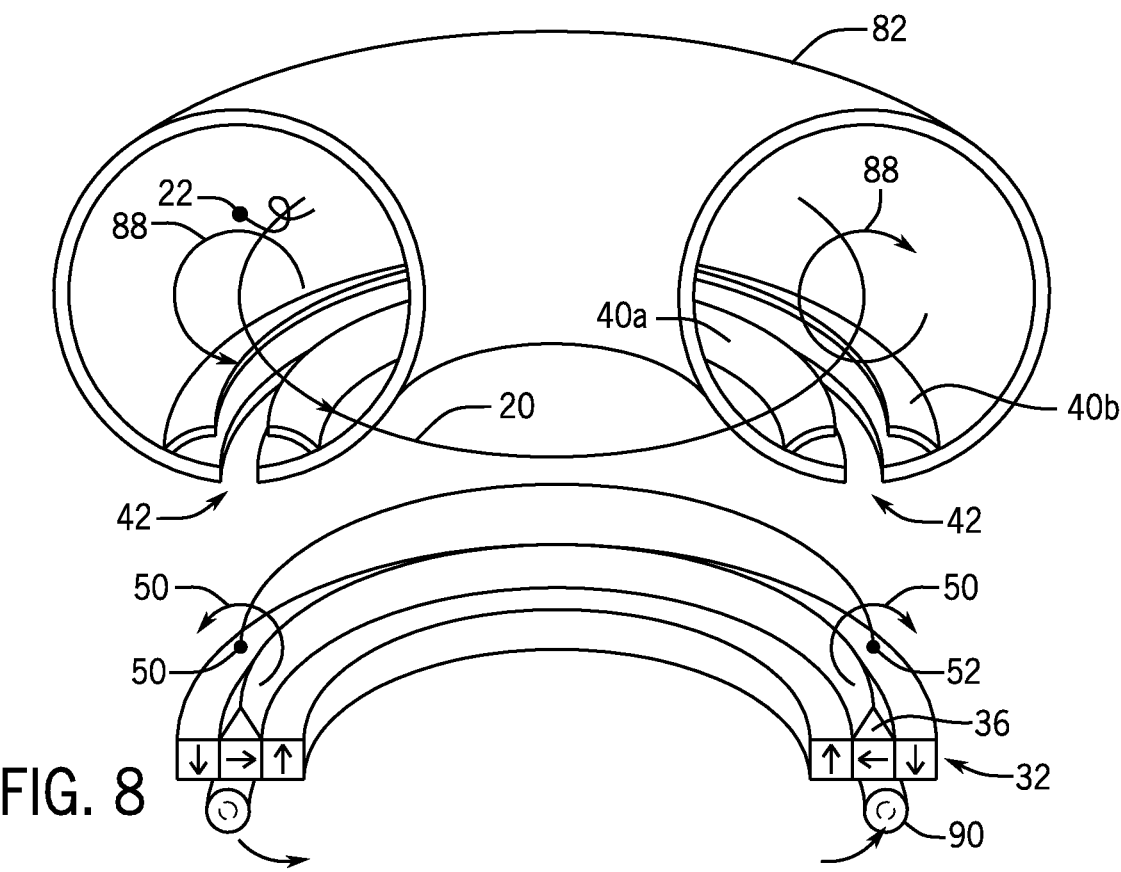
FIG. 8 depicts application of the invention to a toroidal plasma containment system.

Referring now to FIG. 8, it will be appreciated that the present invention is not limited to mirror containment vessels as discussed but may also be used for toroidal pressure vessels 82 in which the containment field lines 20 pass in rings within the toroid around which the plasma 22 passes helically. In this embodiment, the opening 42 extraction volume walls 40a and 40b may be circular, for example, along a lower wall of a toroidal and tubular pressure vessel 82. The divertor magnet structure 32 thus becomes a ring following the circular opening 42 with a corresponding ring-shaped divertor target 36 on its upper surface. The diverting field lines 50, in this case, are counter not to the containment field lines 20 but rather the circumferential field lines 88 caused by the circulating charges of the plasma 22. The bucking field lines 50, as before, create a corresponding ring of X points 52 centered on the opening 42.

Such toroidal designs often require that the divertor be deactivated prior to generation of the plasma which may be accomplished by activating electromagnetic coil 90 operating momentarily and only to counter the relatively lower field of the magnet structure 32 and thus eliminating the need for superconducting coils.

The present application incorporates disclosure of US patent application 2019/0326029 entitled: Apparatus and Method for Generating Medical Isotopes, and US application 2013/0142296 entitled: Apparatus and Method for Generating Medical Isotopes which describe additional techniques for managing isotope transmutation including the use of neutron multiplier generators and other construction details and mechanisms for producing a neutral beam discussed above.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. An apparatus for producing plasma having an energy that allows for nuclear fusion, comprising:
    a containment volume within a vessel;
    an extraction volume outside of the containment volume;
    a containment field magnet structure providing containment magnetic flux lines, wherein the containment magnetic flux lines are configured to provide cyclonic retention of plasma ions at nuclear fusion energies in the containment volume; and
    a divertor magnet structure of permanent magnets located adjacent to the containment volume,
    wherein the divertor magnet structure is positioned to create an X point of zero magnetic field,
    wherein the X point allows plasma ions at a periphery of the containment volume to escape into the extraction volume.

2. The apparatus of claim 1 further including a neutron absorption structure surrounding the containment volume and absorbing neutron energy, and wherein the divertor magnet structure is between the neutron absorption structure and the containment volume.

3. The apparatus of claim 2 wherein the neutron absorption structure provides at least one of: (a) a reaction volume to receive neutrons therethrough and containing an element for transmutation into a different element and (b) at least portions of an electrical generator receiving neutrons from the reaction volume to generate electrical power.

4. The apparatus of claim 1 further including a thermal absorption structure surrounding the containment volume providing cooling channels for receiving circulating coolant, and wherein the divertor magnet structure is between the thermal absorption structure and the containment volume.

5. The apparatus of claim 1 further including a coolant flow system providing coolant flow conduits in thermal communication with permanent magnets, a coolant flow pump, and a coolant cooler to recirculate coolant to extract heat from the divertor magnet structure.

6. The apparatus of claim 1 wherein the divertor magnet structure provides a first hoop of permanent magnet material generating flux lines in the containment volume counter to the containment magnetic flux lines.

7. The apparatus of claim 6 wherein the divertor magnet structure provides a Halbach array further including second and third hoops together flanking the first hoop and having magnetic polarization with opposite polarity to each other.

8. The apparatus of claim 1 further including walls separating the containment volume from the extraction volume and providing an opening centered about the X point, the walls extending away from a plane perpendicular to the containment magnetic flux lines as the walls extend away from the opening.

9. The apparatus of claim 1 wherein the containment field magnet structure provides a mirror containment field providing axially-extending magnetic flux lines converging at opposed first and second ends of the containment volume providing ion turnaround points and wherein the divertor magnet structure is placed toward a center position between the first and second ends.

10. The apparatus of claim 9 further including multiple divertor magnet structures placed symmetrically with respect to a center position between the first and second ends.

11. The apparatus of claim 1 wherein the containment field magnet structure provides a mirror containment field providing axially-extending magnetic flux lines converging at opposed first and second ends of the containment volume providing ion turnaround points and wherein the divertor magnet structure includes a first and second divertor magnet structure placed at corresponding first and second ends outside of the turnaround points for plasma ions at fusion energies.

12. The apparatus of claim 1 wherein the containment field magnet structure provides a toroidal containment volume.

13. The apparatus of claim 1 further including a target in the extraction volume presenting a face for receiving escaping plasma ions and deflecting the escaping plasma ions into a walled chamber outside of the containment volume.

14. The apparatus of claim 1 further including a permanent magnet shield layer positioned between the permanent magnet and the containment volume.

15. The apparatus of claim 1 further wherein the permanent magnets are rare earth alloys having magnetization of greater than 1 T.

16. The apparatus of claim 1 further wherein the permanent magnets are iron nitride magnets.

* * * * *